United States Patent
Nigam et al.

(10) Patent No.: US 9,954,805 B2
(45) Date of Patent: Apr. 24, 2018

(54) GRAYMAIL FILTERING-BASED ON USER PREFERENCES

(71) Applicant: McAfee, Inc., Santa Clara, CA (US)

(72) Inventors: Paras Nigam, Bangalore (IN); Mohammed Mohsin Dalla, Karnataka (IN); Dilip Kumar Gudimetla, Karnataka (IN)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/232,585

(22) Filed: Aug. 9, 2016

(65) Prior Publication Data

US 2018/0026926 A1 Jan. 25, 2018

(51) Int. Cl.
| | |
|---|---|
| *G06F 15/16* | (2006.01) |
| *H04L 12/58* | (2006.01) |
| *H04L 29/08* | (2006.01) |
| *G06N 99/00* | (2010.01) |

(52) U.S. Cl.
CPC .......... *H04L 51/12* (2013.01); *G06N 99/005* (2013.01); *H04L 51/22* (2013.01); *H04L 67/22* (2013.01)

(58) Field of Classification Search
CPC ............................... H04L 51/28; H04L 51/12
See application file for complete search history.

(56) References Cited

U.S. PATENT DOCUMENTS

| | | | | |
|---|---|---|---|---|
| 7,668,920 B2 * | 2/2010 | Lin | ...................... | G06Q 10/107 709/206 |
| 8,214,437 B1 * | 7/2012 | Alspector | ......... | G06F 17/30707 709/200 |
| 9,245,225 B2 * | 1/2016 | Winn | ................ | G06F 17/30702 |
| 2004/0039786 A1 | 2/2004 | Horvitz et al. | | |
| 2005/0097435 A1 * | 5/2005 | Prakash | .................. | H04L 51/12 715/229 |
| 2005/0198289 A1 * | 9/2005 | Prakash | ............... | G06Q 10/107 709/225 |
| 2006/0095524 A1 * | 5/2006 | Kay | ..................... | G06Q 10/107 709/206 |
| 2007/0156886 A1 | 7/2007 | Srivastava | | |
| 2007/0208850 A1 | 9/2007 | Lin et al. | | |
| 2008/0126495 A1 | 5/2008 | Lynn et al. | | |
| 2009/0327430 A1 * | 12/2009 | Colvin | ................. | G06Q 10/107 709/206 |
| 2010/0211641 A1 * | 8/2010 | Yih | ......................... | G06F 15/16 709/206 |
| 2011/0246584 A1 | 10/2011 | Vitaldevara et al. | | |
| 2013/0086180 A1 * | 4/2013 | Midgen | ............... | H04L 12/5855 709/206 |

OTHER PUBLICATIONS

International Search Report and the Written Opinion of the International Searching Authority, dated Oct. 6, 2017, 10 pages.

\* cited by examiner

*Primary Examiner* — Cheikh Ndiaye
(74) *Attorney, Agent, or Firm* — Blank Rome, LLP

(57) ABSTRACT

A graymail detection and filtering system predicts whether a user will consider an email to be graymail using a classifier model based on features extracted from the email. The email is labelled as graymail or non-graymail based on the prediction. User actions are tracked on the email to determine whether the user actually considered the email to be graymail or non-graymail and the classifier model is trained using machine learning techniques to improve the prediction, without requiring explicit user feedback on whether the user considered the email to be graymail or non-graymail.

24 Claims, 8 Drawing Sheets

GRAYMAIL FILTERING-BASED ON USER PREFERENCES

TECHNICAL FIELD

Embodiments described herein generally relate to email handling, and in particular to techniques for filtering email for graymail.

BACKGROUND ART

Graymails are defined as solicited bulk mail messages that don't fit the definition of spam. Graymails might have been opted into by a recipient but the recipient is no longer interested in the emails. In addition, an email can be considered as graymail for one user but that could be an important email for another user of the same organization. For example, a person buying a house may subscribe to receive mailing related to furniture as the person considers buying furniture for the new house. Once the house and the furniture is bought, the person typically has less interest in the emails about buying furniture, and those emails become graymail for that person. Another person, however, may at that point just be starting to buy some furniture, so furniture-related emails for that other person might not be graymail. Thus, the classification as graymail or non-graymail is user-dependent.

Hence, filtering graymail is a major problem for organizations because even an optimal filter will perform unsatisfactorily unless user preferences are taken into account. Existing methods of graymail detection and filtering explicitly ask users to report graymail. However, these methods might not be scalable as recipients often find providing feedback on each graymail an additional nuisance and simply do not reliably report receiving graymail.

DESCRIPTION OF EMBODIMENTS

Figure 1:
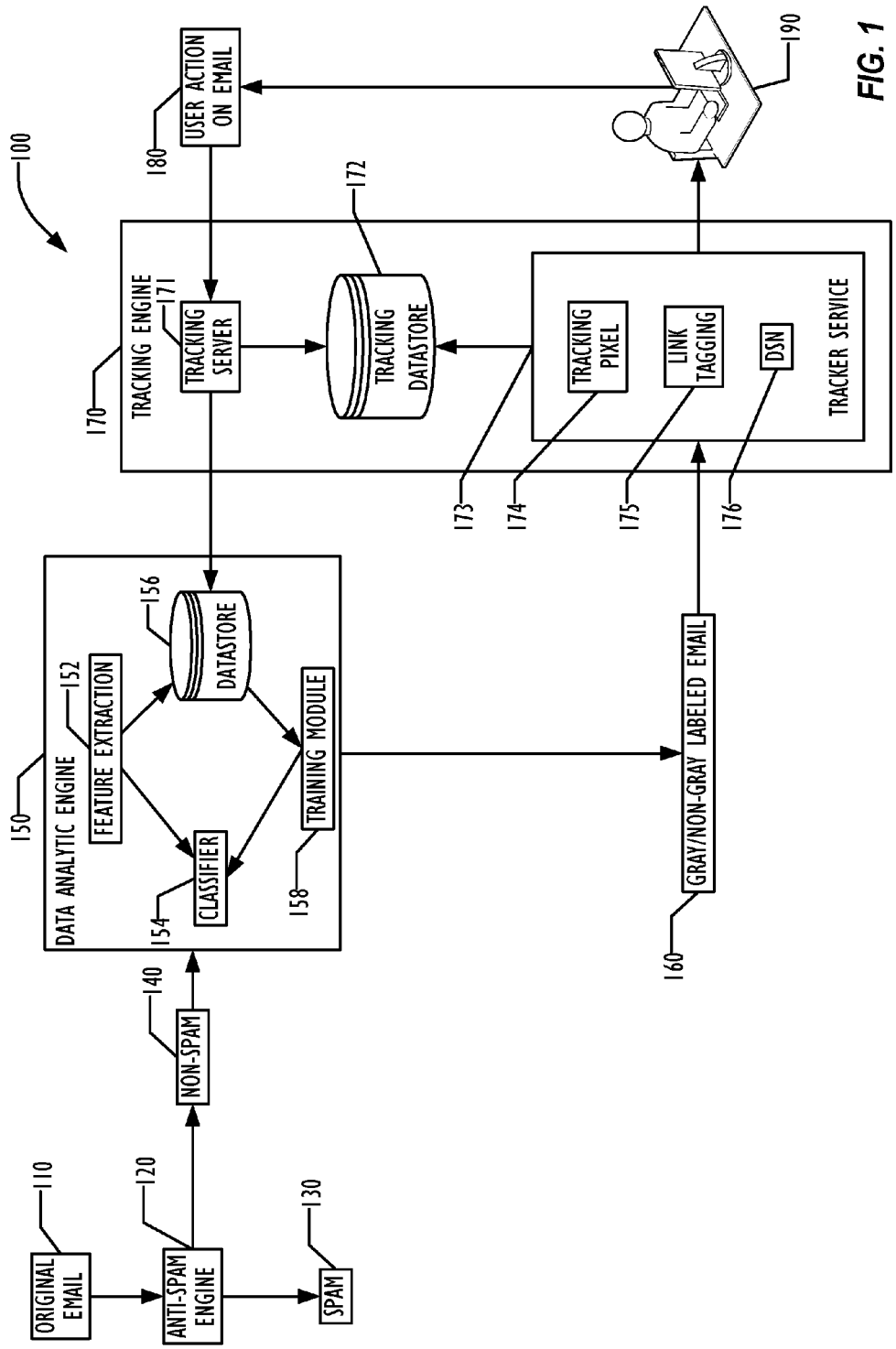
FIG. 1 is a block diagram illustrating an architecture for graymail detection and filtering according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

The innovative approach described below allows understanding an email recipient's (or user's) current preferences without explicitly seeking feedback from the recipient. Using this approach, real-time usage patterns of the email recipient are captured, such as what kind of emails are read, deleted etc. The approach does not require a presence on the endpoint. Hence, this approach works regardless of the client used by email recipient.

Without explicitly seeking feedback from email recipient, user preferences can be understood by capturing user actions on email using tracking techniques. User actions on email, such as read, delete, glance, etc., are captured through tracking services without compromising the privacy of the end user. These captured actions are combined with a history of such actions on similar emails and are considered as user feedback to determine what might be more or less important to a user. This feedback is fed into a data analysis engine to predict user preferences of future emails and thereby detect graymail specific to each user. Since user preferences might change frequently, this model constantly learns user preferences and adapts to the needs of each user in effectively filtering graymail. The user feedback thus enhances the data model for better graymail predictions.

The user feedback is captured without explicitly seeking feedback from the user, instead deducing the feedback by using tracking techniques. The graymail filtering system learns the importance of each email to the user by capturing and analyzing user actions. This ensures continuous user feedback as there is no extra overhead involved for the user to give feedback. This information is further fed into data analytics engine to predict the importance of any emails received in the future. Utilizing continuous feedback model, adapting the needs of the user in real-time, thus provides a continuously improving data model, without burdening the user or depending on the user to provide explicit feedback, which experience shows to be unreliable, and provides incomplete feedback. Getting user feedback is a tedious task and requires either user interference or complete control over the user infrastructure and services. An organization employing these techniques may provide better graymail protection to its members than can be achieved using other approaches, such as the kind of organization-wide rules-based approach that may be used for spam filtering.

The approach described herein ensures the complete and continuous feedback using tracking services to capture user actions on emails without explicitly asking user for feedback on the email. The tracking services are platform independent and require no control over the platform or email client used by the user. The tracking services that are presented below are capable of identifying read, print, time spent on email, link click etc. by using tracking pixel and link tagging techniques and utilizing this information to improve the experience the email recipient without compromising the privacy of the user.

FIG. 1 is a block diagram illustrating an architecture for a graymail detection and filtering system 100 according to one embodiment. An original email 110 is received and in some embodiments is pre-processed by an anti-spam engine 120. If the anti-spam engine 120 determines that the email 110 is spam, then no further processing is required by the graymail detection and filtering architecture, and the email, now identified as spam email 130 may be processed according to whatever spam handling techniques are in use. If the anti-spam engine 120 determines that the email 110 is not spam, then the email, now identified as non-spam email 140 may be passed to a data analytics engine 150 for graymail detection and filtering.

In some embodiments, the anti-spam engine 120 may be omitted or the email 110 may be passed to the data analytics engine 150 for graymail processing even if the anti-spam engine 120 labels the email 110 as spam.

The data analytics engine 150 processes the email. The email is then labelled as either graymail or non-graymail as a result of the analysis by the data analytics engine 150. In some embodiments, the labelling is performed as a result of output of the data analytics engine 150, while in other embodiments, the labelling is performed by the data analytics engine 150. A feature extraction module 152 extracts features from the email and passes them to a classifier 154 that may then classify the email as graymail or non-graymail. The extracted features may also be stored in a datastore 156. A training module 158 may use information from the datastore 156 to train the classifier 154, improving its ability to perform classification.

The analyzed email is labelled as being graymail or non-graymail, and the labelled email 160 is passed to a tracking engine 170, that allows detecting user actions on the email to allow for improvement of the classification. A tracker service 173 may modify the labelled email to allow tracking user actions, such as by inserting a tracking pixel 174, creating tagged uniform resource locators (URLs) 175, or taking advantage of delivery service notifications 176 to recognize delivery of the email to the user 190. Information about the tracking materials may be stored in a tracking datastore 172. A tracking server 171 or the tracking engine 170 then detects user actions 180 on the email, and updates the tracking datastore 172 and sends information about the detected actions to the data analytics engine 150 for updating the datastore 156 for use by the training module 158 to improve the classifier 154.

Figure 2:
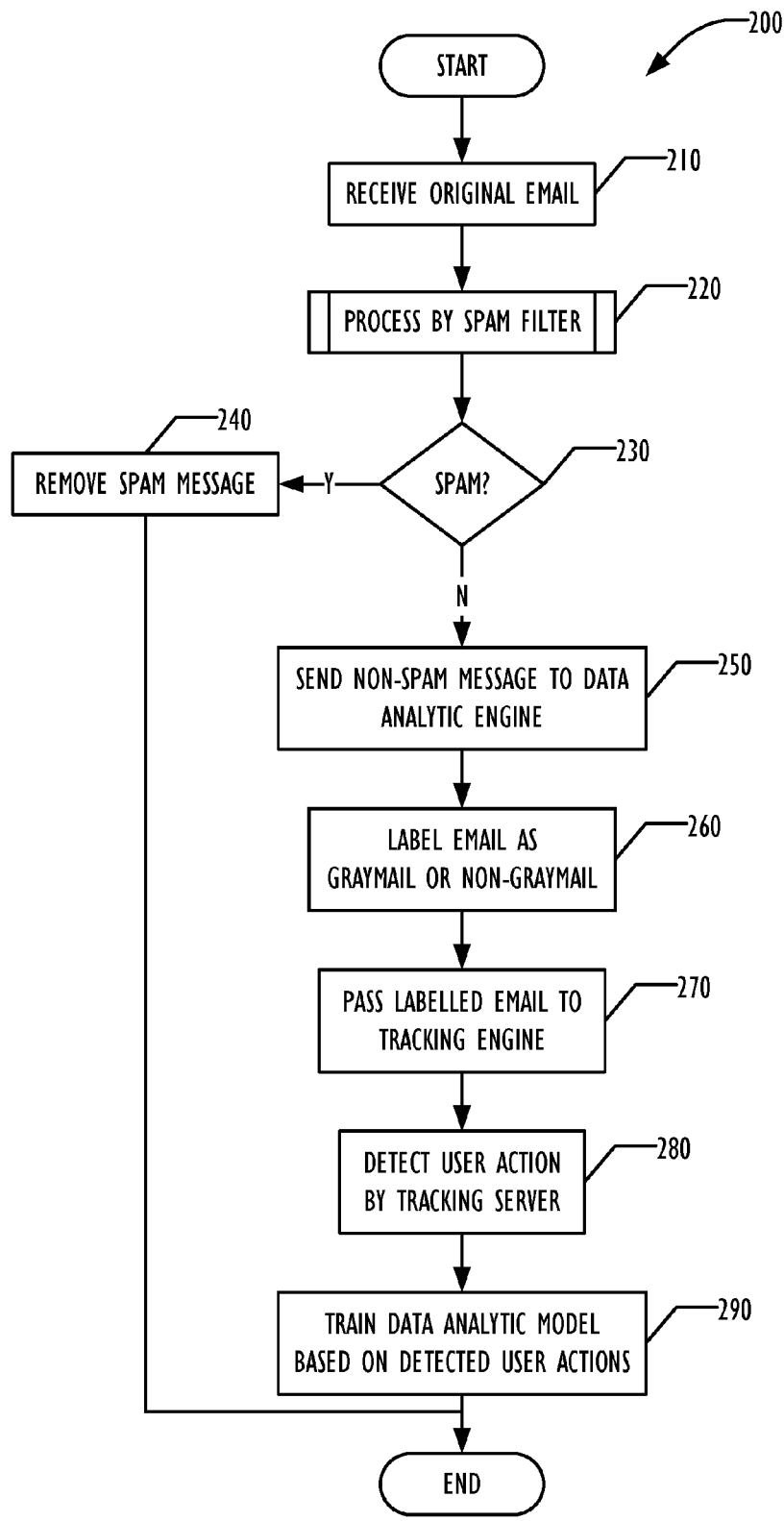
FIG. 2 is a flowchart illustrating a technique for graymail detection and filtering according to one embodiment.

FIG. 2 is a flowchart 200 illustrating a technique for graymail detection and filtering according to one embodiment. In block 210 the original email is received by an email server. In block 220, the anti-spam engine 120 processes the email to determine whether the email is spam. In block 230, if the email is considered spam, processing continues in block 230, where the spam email may removed in block 240 and not sent to the user 190, or any other action provided by spam detection and filtering systems may be used. For example, instead of not delivering the spam message to the user 190, the email may be marked as spam and sent to the user 190, allowing the user to decide how to process spam email.

The non-spam email is sent to the data analytics engine 150 in block 250, which then analyzes it to determine whether the email is graymail. In block 260, the email is labelled as graymail or non-graymail. The labelling may be performed by the data analytics engine 150 or may be performed by another element as desired.

In block 270, the labelled email is passed to the tracking engine 170, which inserts tracking material into the email before delivering it to the user 190. In block 280, user actions on the may be detected, such as reading the email, deleting it, printing it, etc. Information about the user actions may be useful for training the classifier 154 in block 290, so the tracking engine 170 passes information back to the data analytics engine 150 for that purpose.

Figure 3:
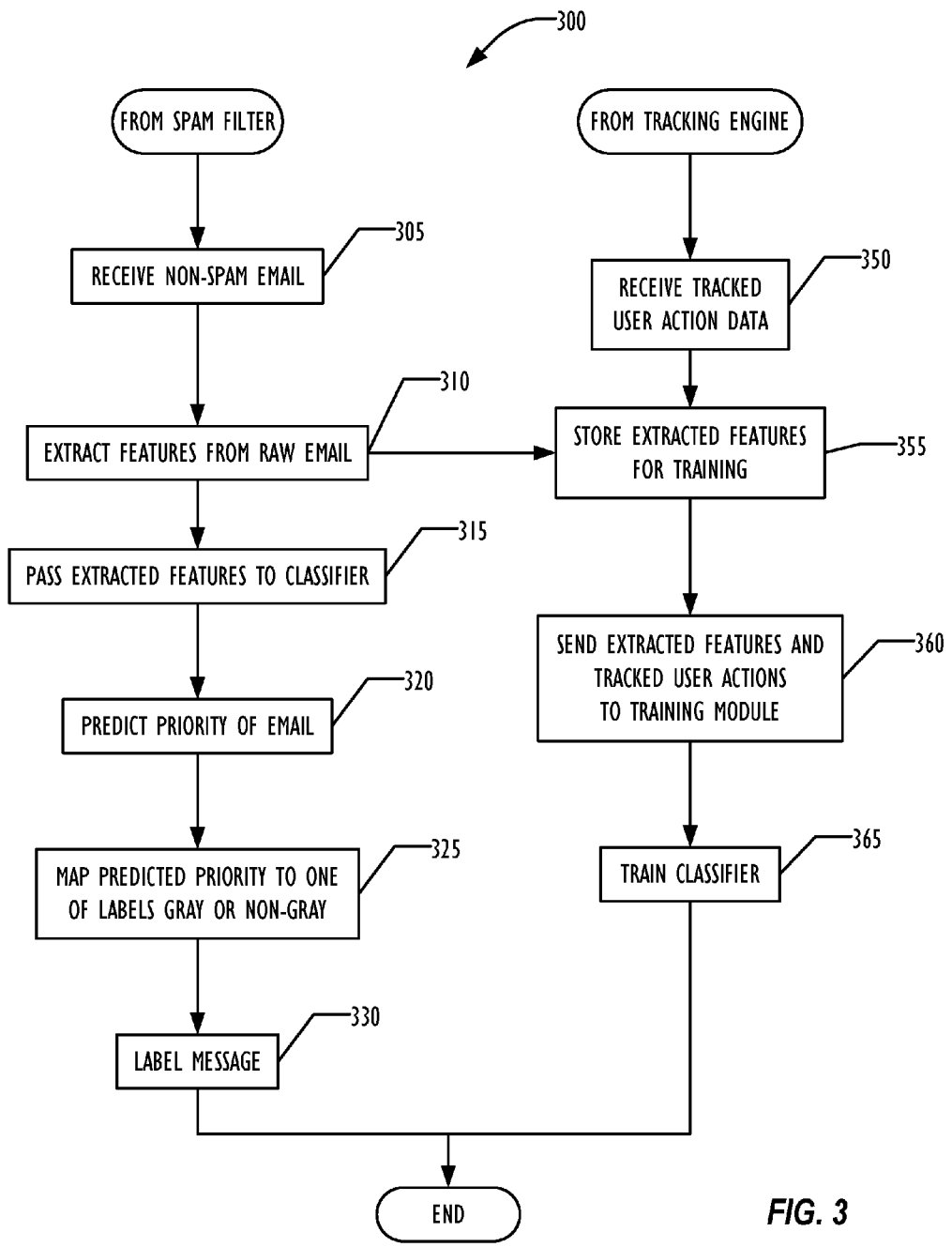
FIG. 3 is a flowchart illustrating a technique for labelling an email as graymail or non-graymail according to one embodiment of a data analytics engine.

FIG. 3 is a flowchart illustrating a technique 300 for labelling an email as graymail or non-graymail according to one embodiment of a data analytics engine. Two paths are illustrated. In a first path, non-spam email received from the anti-spam engine 120 are processed and classified. In a second path, the classifier 154 is trained to improve the classification based on tracking information received from the tracking engine 170.

In the first path, the non-spam email is received from the anti-spam engine 120 in block 305. In block 310, features are extracted by the feature extraction module 152 from the raw email that are relevant to the graymail detection procedure. Any desired set of features may be extracted. In some embodiments, these features may include any or all of: (a) email header information; (b) URLs contained in the body of the email; (c) text contained in the header or body of the email; (d) attachments to the email; and (e) a filename of the email. This list is illustrative and by way of example only, and any feature or characteristic of the email may be extracted by the feature extraction module 152. In some embodiments, textual content of the email is extracted into a bag of words. The extracted features are typically converted into numeric values for use by the classifier 154. The extracted features are also stored in a datastore 156 in block 355 for training the classifier 154.

In block 315 the extracted features are passed to the classifier 154. In one embodiment, the classifier 154 may employ a regression model. In other embodiments, the classifier may employ a support vector machine. However, the classifier 154 may be any type of classifier. Preferably, the classifier 154 employs machine learning techniques to provide supervised learning when building a classification model that for assigning the email into either graymail or non-graymail categories.

In block 320, the result of the classifier 154 may be used to predict a priority of the email, where the priority is a value indicating a likelihood that the user 190 would consider the email to be graymail, or alternately, a likelihood that the recipient would consider the email to be non-graymail. A threshold priority value may be defined such that classified priority values having a particular relationship with the threshold priority value are classified as graymail, and classified priority values having another relationship with the threshold priority value are classified as non-graymail. For example, one embodiment may set a threshold priority value and any email having a classified priority value greater than or equal to the threshold priority value is classified as non-graymail, while an email having a classified priority value less than the threshold is classified as graymail. In another embodiment, email having a classified priority value greater than the threshold priority may be classified as graymail, while email having a classified priority value less than or equal to the threshold priority value may be classified as non-graymail. Any relationship with the threshold priority value may be used to classify the email as graymail or non-graymail.

In block 325, the data analytics engine 150 maps the priority value into one of the labels graymail or non-graymail. Finally, in block 330, the email is labelled as graymail or non-graymail based on the predicted priority value. In some embodiments, the labelling is performed by adding a header to the email message containing the labelling information. The header may contain the label in any desired format. Other techniques for labelling the email may be used as desired. The header need not be one that the user email client presents to the user 190, but may be a header that is normally hidden from the user 190. In embodiments in which the data analytics engine is aware of what email client is used by the user 190, the label may be inserted in a way that is dependent on the email client. The email client may be configured to react to the graymail or non-graymail labelling in any desired way, typically by employing rules that cause actions based on the labels, such as automatically moving graymail emails to a folder designated for graymail emails. Although no modification to email client software is required for this technique to function, in some embodiments, the email client may be modified for processing graymail emails differently if desired.

In the second path through the data analytics engine 150, information is received from the tracking engine 170. In block 350, tracked user action data is received. The tracked user action data is stored in the datastore 156 in block 355. The extracted features and tracked user action data stored in the datastore 156 are then sent in block 360 to the training module 158, which trains the classifier 154 in block 365.

Any supervised machine learning technique known to the art may be used by the training module for training the classifier 154 based on the information in the datastore 156. The datastore 156 may be implemented as any type of database known to the art. To allow the classifier to be trained differently for different users, the datastore includes information to identify the user as well as the extracted features and user action information.

Figure 4:
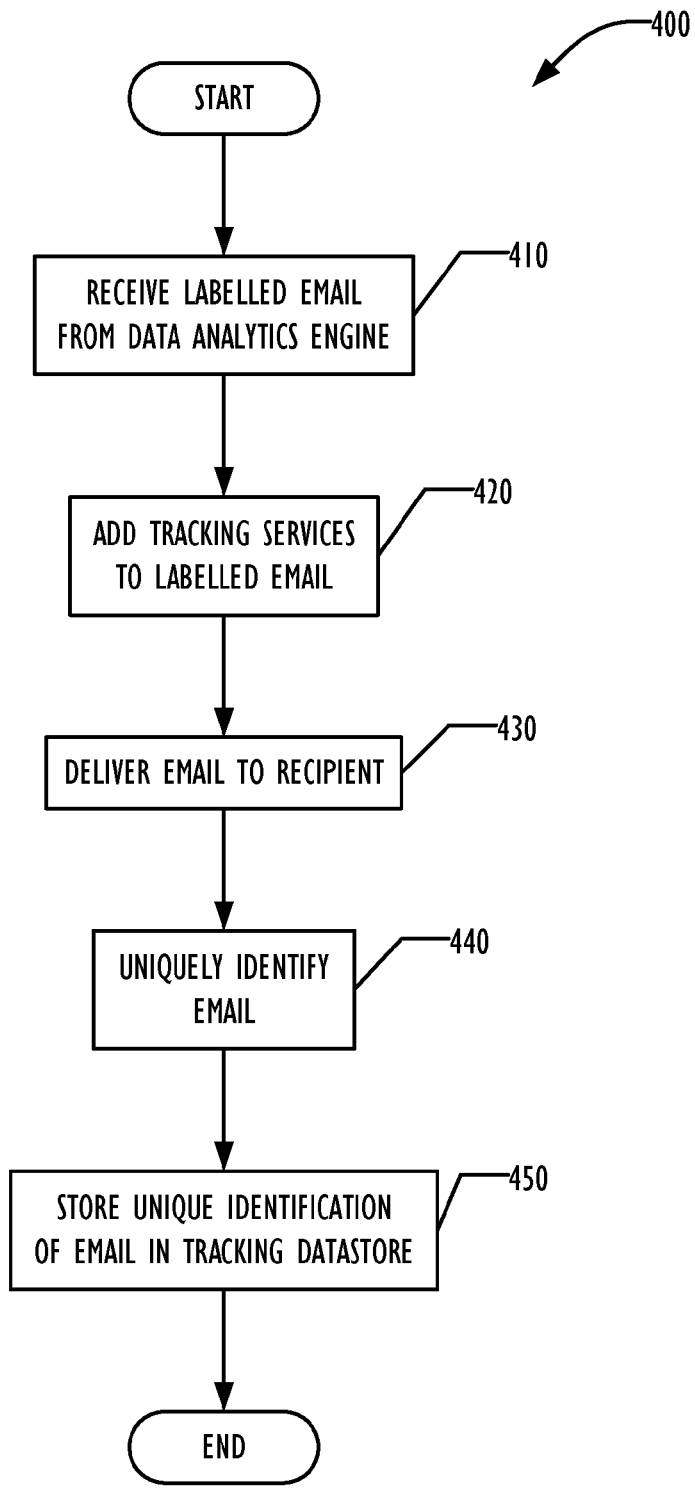
FIG. 4 is a flowchart illustrating inserting tracking information into labelled emails according to one embodiment.

FIG. 4 is a flowchart 400 illustrating inserting tracking information into labelled emails according to one embodiment.

In block 410, the tracking service 173 of the tracking engine 170 receives the labelled email from the data analytics engine 150. In block 420, the tracking service 173 adds tracking services to the email, regardless of whether the email is labelled graymail or non-graymail. These tracking services may include any technique to allow the tracking engine to detect actions by the user 190 on the email. For example, tracking pixels may be inserted, which are HyperText Markup Language (HTML) code segments that result in an invisible image element on the web page, typically a 1×1 image. A URL in the HTML code causes retrieval of the image element from a server, in this case the tracking engine 170 or a server associated with the tracking engine 170. Upon receipt of the request for the image, the tracking engine 170 can determine that the email has been opened for reading. In one embodiment, the tracking pixel image may be an image that typically requires a known amount of time to transmit to the user. If the user 190 closes the message before the entire image file is received, downloading of the image stops. By determining how much of the image was transmitted to the user, the tracking engine 170 can determine how long the email was read by the user. In some embodiments, any amount of time reading an email over a predetermined amount of time is an indication that the user did more than glance at the email.

Although illustrated as a module of the tracking engine 170, the tracking service 173 may be implemented as a separate engine communicatively coupled to the tracking engine 170 if desired.

URLs in the email may be tagged or modified by the tracking service 173 to cause any attempt to traverse the link to generate not only the link to the destination of the original URL, but also a link to the tracking engine 170 or associated website, which may then be interpreted as indicating the user clicked on or otherwise selected the URL in the email. Doing so is typically an indication of interest in the content of the email. Other types of tracking information may be inserted into the email that can cause feedback to the tracking engine 170 when the user 190 takes an action on the email. For example, a cascading style sheet (CSS) may be inserted into the email that cause sending feedback to the tracking engine 170 when the user 190 prints the email.

Once the tracking information has been inserted into the email, the email is delivered to the user in block 430. In some embodiments, rules or other action guidance may be defined in the email client used by the user 190 that move graymail emails into a separate folder, but that is not required. In some embodiments, rules may be defined that simply delete emails labelled as graymail, although that may inhibit the ability of the user 190 to exhibit behavior that indicates that email labelled as graymail should really be labelled as non-graymail. In block 440, the tracking service 173 attempts to identify the email with a unique identifier, to allow the tracking engine to recognize when user actions are performed on that email. The unique identification is stored in the tracking datastore 172 in block 450. The tracking datastore 172 may also store information about the tracking information inserted into the email. The tracking datastore is typically implemented as a database of any desired format. Any desired format for storing the tracking and unique identification information may be used.

Figure 5:
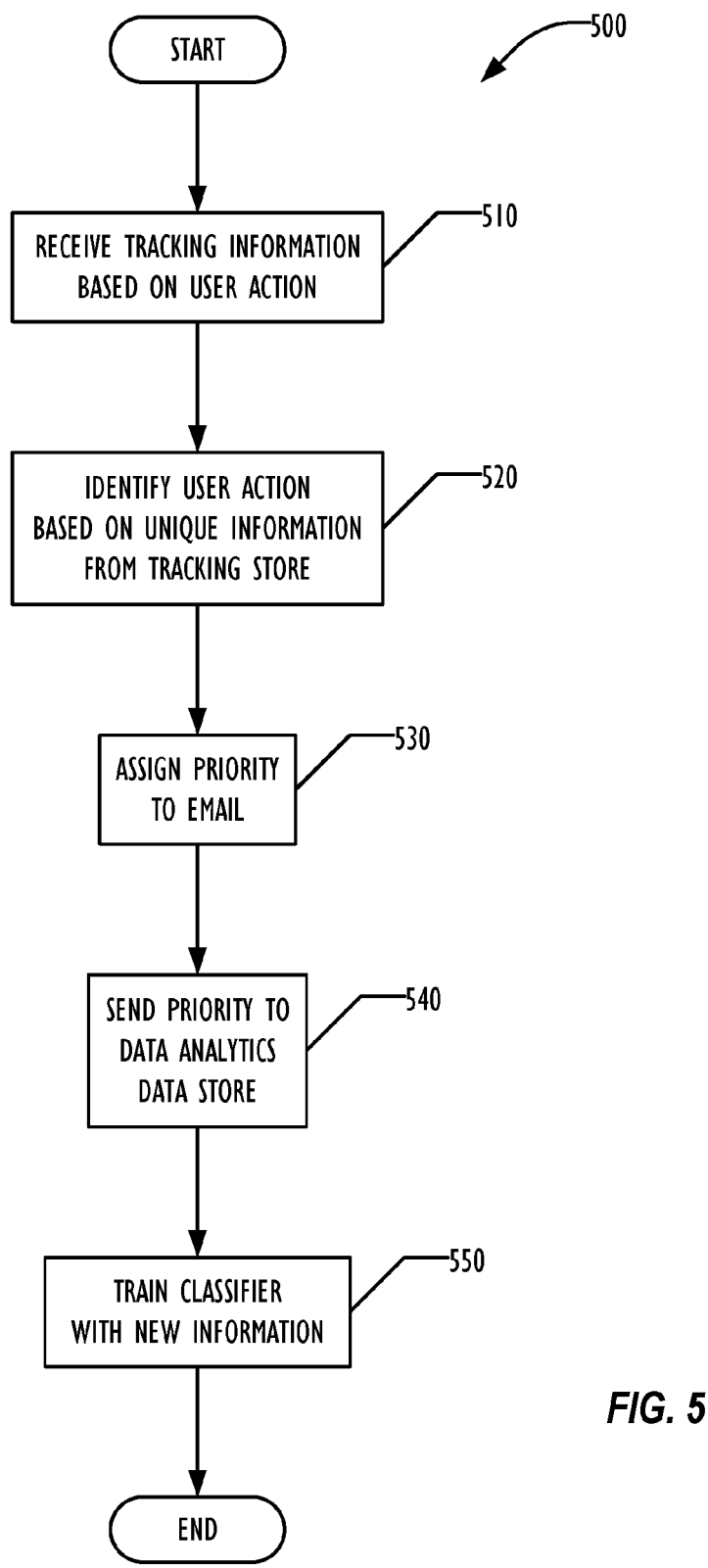
FIG. 5 is a flowchart illustrating detecting user actions on an email according to one embodiment.

FIG. 5 is a flowchart 500 illustrating detecting user actions on an email according to one embodiment. The tracking engine 170 in block 510 receives tracking information based upon a user action 180. As described above, the user action 180 may be any user action capable of being tracked that is considered useful for determining the user 190's preferences regarding graymail or non-graymail. The tracking information received depends on the type of tracking information inserted into the email.

In block 520, the user action 180 is identified based on the unique information stored in the tracking datastore 172, based on uniquely identifying the email acted upon in the user action 180. A priority value may then be determined in block 530, based on the tracking information. For example, an indication that the user deleted the email without reading it suggests that the email may be graymail. An indication that the user printed the email or read it for a significant amount of time suggests that the email is non-graymail. This priority value, unlike the priority value originally assigned to the email by the data analytics engine is therefore based on feedback about the user's preferences about this specific message, rather than a prediction of priority based on the user 190's history.

The user 190 may be completely unaware that the user action 180 is being monitored or that the user action is being used to indicate graymail or non-graymail. Indeed, the user 190 may have no knowledge that the graymail detection and filtering system 100 is deployed or anything about how it works. In some embodiments, the user 190 has no ability to configure the graymail detection and filtering system 100. Although the user may establish rules for processing emails labelled as graymail, such rule establishment is not considered in this disclosure to be configuring the graymail detection and filtering system 100. Thus, unlike systems in which the user is asked to indicate whether the mail is graymail, there disclosed graymail detection and filtering system 100 has little or no perceptual user overhead or interference with the user 190's actions, even while providing user feedback on the identification of email as graymail or non-graymail.

The priority value determined by the tracking engine is passed back to the data analytics engine 150 in block 540, for updating the datastore 156. This allows the training module 158 to use the updated datastore 156 information for the user 190 to train the classifier 154 in block 550 with the newly tracked information, improving the classifier 154's ability to classify email as graymail or non-graymail based on user preferences, but without requiring direct feedback by the user 190.

The data analytics engine 150 and tracking engine 170 are typically implemented on servers run by an enterprise deploying the graymail detection and filtering system 100. The servers may be any desired type of programmable device, including virtual devices implemented on physical hardware. The data analytics engine 150 may be implemented on a server with the tracking engine 170 on another server, or both may be implemented on a combined server, based on the operational characteristics of the server and the load. In some embodiments, multiple data analytics engine 150 may be implemented on multiple servers that share a common datastore 156 for performance and reliability reasons. Similarly, the tracking engine 170 may be implemented on multiple servers with a shared tracking datastore 172.

Figure 6:
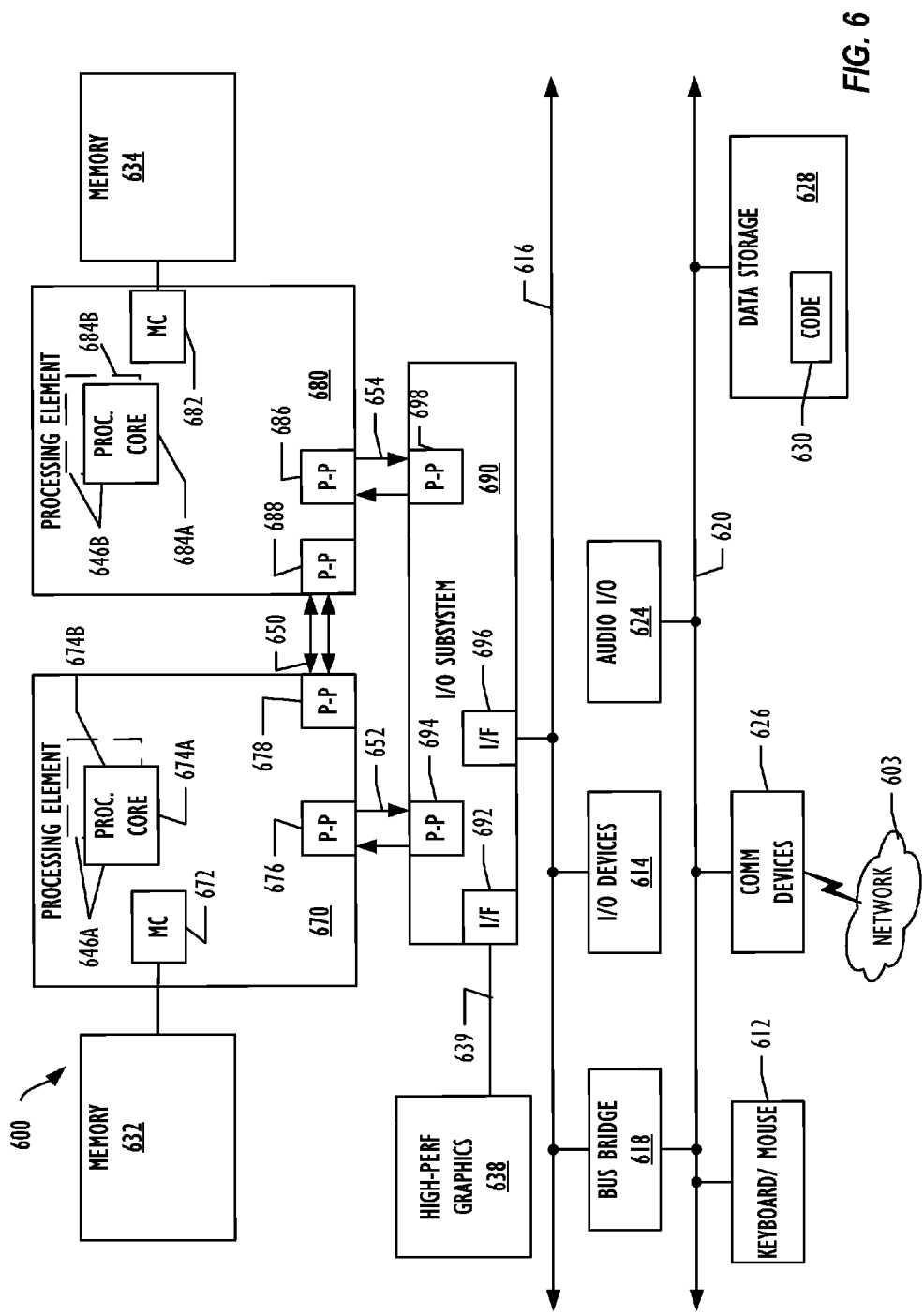
FIG. 6 is a block diagram illustrating a computing device for use with techniques described herein according to one embodiment.

Referring now to FIG. 6, a block diagram illustrates a programmable device 600 that may be used for implementing the techniques described herein in accordance with one embodiment. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688.

As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618 that may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second link 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. In addition, the elements of FIG. 6 may alternatively be partitioned using more or fewer integrated chips than illustrated in FIG. 6.

Figure 7:
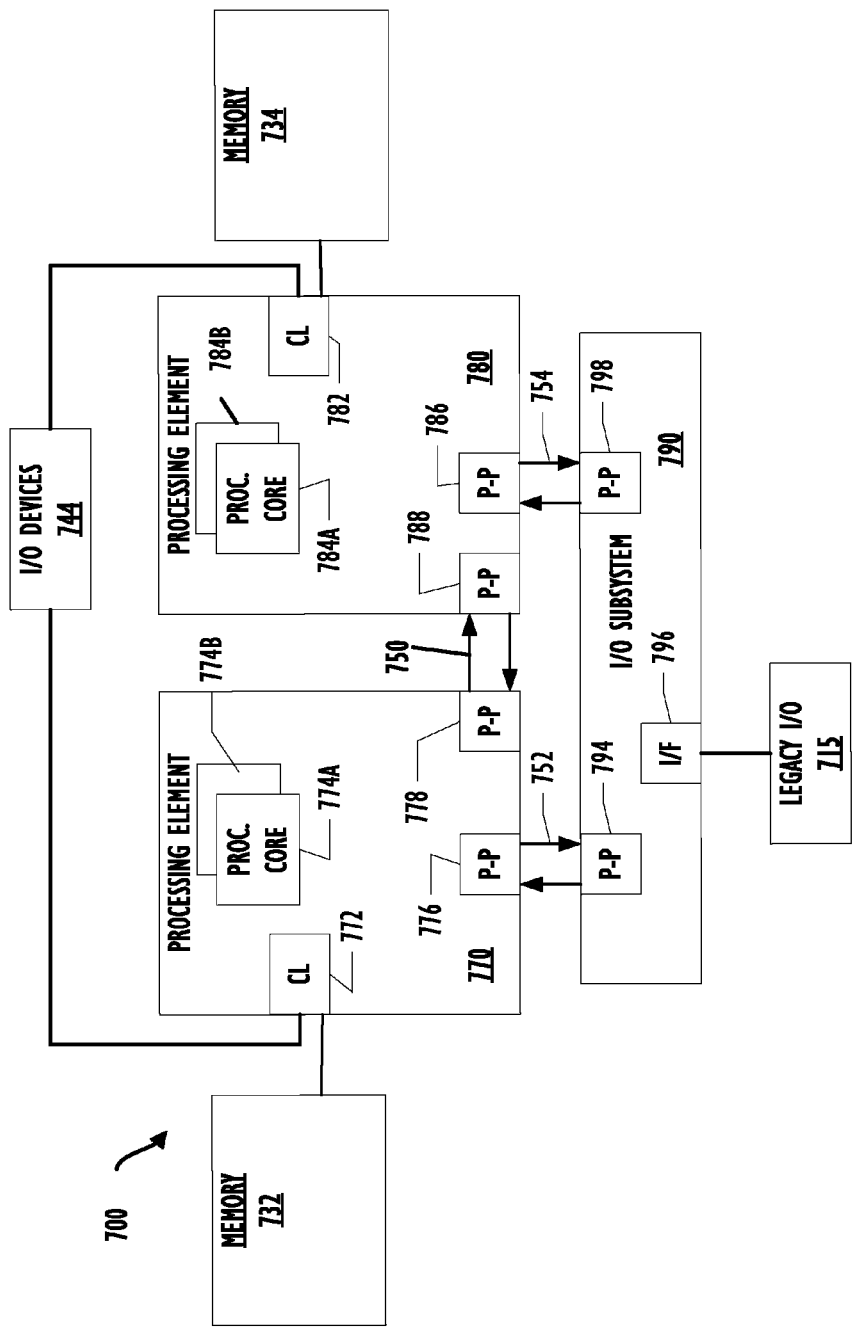
FIG. 7 is a block diagram illustrating a computing device for use with techniques described herein according to another embodiment.

Referring now to FIG. 7, a block diagram illustrates a programmable device 700 according to another embodiment. Certain aspects of FIG. 7 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the CL 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A and 784B. As illustrated in FIG. 7, I/O subsystem 790 includes point-to-point (P-P) interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 6 and 7 are schematic illustrations of embodiments of programmable devices that may be utilized to implement various embodiments discussed herein. Various components of the programmable devices depicted in FIGS. 6 and 7 may be combined in a system-on-a-chip (SoC) architecture.

Figure 8:
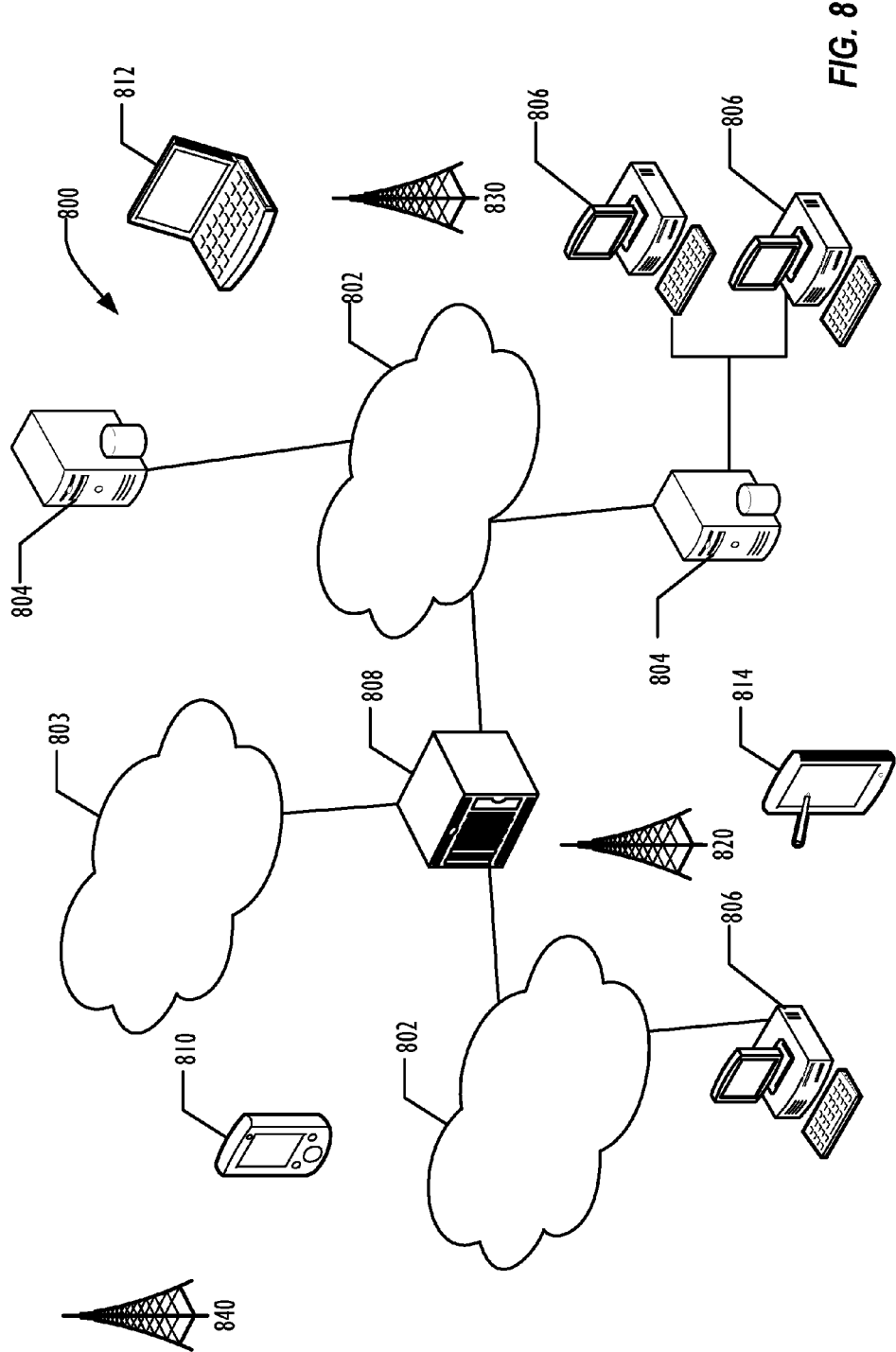
FIG. 8 is a block diagram illustrating a network of programmable devices according to one embodiment.

Referring now to FIG. 8, an example infrastructure 800 in which the techniques described above may be implemented is illustrated schematically. Infrastructure 800 contains computer networks 802. Computer networks 802 may include many different types of computer networks available today, such as the Internet, a corporate network or a Local Area Network (LAN). Each of these networks can contain wired or wireless programmable devices and operate using any number of network protocols (e.g., TCP/IP). Networks 802 may be connected to gateways and routers (represented by 808), end user computers 806, and computer servers 804. Infrastructure 800 also includes cellular network 803 for use with mobile communication devices. Mobile cellular networks support mobile phones and many other types of mobile devices. Mobile devices in the infrastructure 800 are illustrated as mobile phones 810, laptops 812 and tablets 814. A mobile device such as mobile phone 810 may interact with one or more mobile provider networks as the mobile device moves, typically interacting with a plurality of mobile network towers 820, 830, and 840 for connecting to the cellular network 803. Although referred to as a cellular network in FIG. 6, a mobile device may interact with towers of more than one provider network, as well as with multiple non-cellular devices such as wireless access points and routers 808. In addition, the mobile devices 810, 812 and 814 may interact with non-mobile devices such as computers 804 and 806 for desired services. So, for example, the user 190 may read and react to email on one of the mobile devices 810, 812, or 814, while the data analytics engine 150 and tracking engine 170 may be deployed on servers 804.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

The following examples pertain to further embodiments.

Example 1 is a method of detecting graymail without explicit user feedback, comprising: receiving an email for a user; extracting features of the email; passing the extracted features to a classifier model; predicting with the classifier model whether the user would consider the email as graymail; tracking user actions on the email; determining whether the user considered the email as graymail responsive to the tracked user actions without explicit user feedback; and training the classifier model responsive to the tracked user actions.

In Example 2 the subject matter of Example 1 optionally includes wherein the classifier model is a regression model.

In Example 3 the subject matter of Example 1 optionally includes wherein predicting with the classifier model whether the user would consider the email as graymail comprises: labelling the email as graymail or non-graymail based on the classifier model.

In Example 4 the subject matter of any of Examples 1-3 optionally includes wherein tracking user actions on the email comprises: inserting tracking elements into the email before providing the email to the user; detecting user actions on the email using the tracking elements; and identifying the detected user actions.

In Example 5 the subject matter of any of Examples 1-3 optionally includes wherein determining whether the user considered the email as graymail comprises: detecting user actions on the email; analyzing the detected user actions; and determining whether the detected user actions indicate the user considers the email as graymail or non-graymail.

In Example 6 the subject matter of any of Examples 1-3 optionally includes further comprising: storing the extracted features in a database.

In Example 7 the subject matter of Example 6 optionally includes wherein training the classifier model comprises: storing information about whether the user considered the email as graymail in the database; and performing supervised learning in the classifier model using the stored extracted features and stored information about whether the user considered the email as graymail.

In Example 8 the subject matter of any of Examples 1-3 optionally includes wherein tracking user actions on the email comprises: identifying the email with a unique identification before providing the email to the user; and associating the user actions with the unique identification of the email.

Example 9 is a computer readable medium, on which is stored software for detecting graymail without explicit user feedback, comprising instructions that when executed by a graymail detection system cause the graymail detection system to: receive an email for a user; extract features of the email; predict with a classifier model based on the extracted features whether the user would consider the email as graymail; track user actions on the email; determine whether the user considered the email as graymail responsive to the tracked user actions without explicit user feedback; and train the classifier model responsive to the tracked user actions.

In Example 10 the subject matter of Example 9 optionally includes wherein the classifier model is a support vector machine model.

In Example 11 the subject matter of Example 9 optionally includes wherein the instructions that when executed cause the graymail detection system to predict with the classifier model whether the user would consider the email as graymail comprise instructions that when executed cause the graymail detection system to: label the email as graymail or non-graymail based on the classifier model.

In Example 12 the subject matter of any of Examples 9-11 optionally includes wherein the instructions that when executed cause the graymail detection system to track user actions on the email comprise instructions that when executed cause the graymail detection system to: insert tracking elements into the email before providing the email to the user; detect user actions on the email using the tracking elements; and identify the detected user actions.

In Example 13 the subject matter of any of Examples 9-11 optionally includes wherein the instructions that when executed cause the graymail detection system to determine whether the user considered the email as graymail comprise instructions that when executed cause the graymail detection system to: detect user actions on the email; analyze the detected user actions; and determine whether the user considered the email as graymail or non-graymail responsive to the analysis.

In Example 14 the subject matter of any of Examples 9-11 optionally includes wherein the instruction further comprise instructions that when executed cause the graymail detection system to: store the extracted features in a database.

In Example 15 the subject matter of Example 14 optionally includes wherein the instructions that when executed cause the graymail detection system to train the classifier model comprise instructions that when executed cause the graymail detection system to: store information about whether the user considered the email as graymail in the database; and perform machine learning in the classifier model using the stored extracted features and stored information about whether the user considered the email as graymail.

In Example 16 the subject matter of any of Examples 9-11 optionally includes wherein the instructions that when executed cause the graymail detection system to track user actions on the email comprise instructions that when executed cause the graymail detection system to: identify the email with a unique identification before providing the email to the user; and associate the user actions with the unique identification of the email.

Example 17 is a system for detecting graymail without explicit user feedback, comprising: a data analytics computer system, comprising: a processing element; and a memory, coupled to the processing element, on which is stored software for predicting whether a user would consider an email graymail, comprising instructions that when executed cause the processing element of the data analytics computer system to: receive an email for a user; extract features of the email; predict with a classifier model based on the extracted features whether the user would consider the email as graymail; and train the classifier model responsive to tracked user actions; and a tracking engine computer system, comprising: a processing element; and a memory coupled to the processing element, on which is stored software for tracking user actions on the email, comprising instructions that when executed cause the processing element of the tracking engine computer system to: track user actions on the email; determine whether the user considered the email as graymail responsive to the tracked user actions without explicit user feedback; and provide information regarding the determination to the data analytics computer system for training the classifier model.

In Example 18 the subject matter of Example 17 optionally includes wherein the classifier model is a regression model.

In Example 19 the subject matter of Example 17 optionally includes wherein the instructions that when executed cause the processing element of the data analytics computer system to predict with the classifier model based on the extracted features whether the user would consider the email as graymail comprise instructions that when executed cause the the processing element of the data analytics computer system to: label the email as graymail or non-graymail based on the classifier model.

In Example 20 the subject matter of any of Examples 17-19 optionally includes wherein the instructions that when executed cause the processing element of the tracking engine computer system to track user actions on the email comprise instructions that when executed cause the processing element of the tracking engine computer system to: insert tracking elements into the email before providing the email to the user; detect user actions on the email using the tracking elements; and identify the detected user actions.

In Example 21 the subject matter of any of Examples 17-19 optionally includes wherein the instructions that when executed cause the processing element of the tracking engine computer system to determine whether the user considered the email as graymail comprise instructions that when executed cause the processing element of the tracking engine computer system to: detect user actions on the email; analyze the detected user actions; and determine whether the user considered the email as graymail or non-graymail responsive to the analysis.

In Example 22 the subject matter of any of Examples 17-19 optionally includes wherein the instruction further comprise instructions that when executed cause the processing element of the data analytics computer system to: store the extracted features in a database.

In Example 23 the subject matter of Example 22 optionally includes wherein the instructions that when executed cause the processing element of the data analytics computer system to train the classifier model comprise instructions that when executed cause the processing element of the data analytics computer system to: store information about whether the user considered the email as graymail in the database; and perform machine learning in the classifier model using the stored extracted features and stored information about whether the user considered the email as graymail.

In Example 24 the subject matter of any of Examples 17-19 optionally includes wherein the instructions that when executed cause the processing element of the tracking engine computer system to track user actions on the email comprise instructions that when executed cause the processing element of the tracking engine computer system to: identify the email with a unique identification before providing the email to the user; and associate the user actions with the unique identification of the email.

Example 25 is an apparatus for detecting graymail without explicit user feedback, comprising: means for receiving an email for a user; means for extracting features of the email; means for predicting with a classifier model based on the extracted features whether the user would consider the email as graymail; means for tracking user actions on the email; means for determining whether the user considered the email as graymail responsive to the tracked user actions without explicit user feedback; and means for training the classifier model responsive to the tracked user actions.

In Example 26 the subject matter of Example 25 optionally includes wherein the classifier model is a support vector machine model.

In Example 27 the subject matter of Example 25 optionally includes wherein the means for predicting with the classifier model whether the user would consider the email as graymail comprises: means for labeling the email as graymail or non-graymail based on the classifier model.

In Example 28 the subject matter of any of Examples 25-27 optionally includes wherein the means for tracking user actions on the email comprises: means for inserting tracking elements into the email before providing the email to the user; means for detecting user actions on the email using the tracking elements; and means for identifying the detected user actions.

In Example 29 the subject matter of any of Examples 25-27 optionally includes wherein the means for determining whether the user considered the email as graymail comprises: means for detecting user actions on the email; means for analyzing the detected user actions; and means for determining whether the user considered the email as graymail or non-graymail responsive to the analysis.

In Example 30 the subject matter of any of Examples 25-27 optionally includes wherein further comprising: means for storing the extracted features in a database.

In Example 31 the subject matter of Example 30 optionally includes wherein the means for training the classifier model comprises: means for storing information about whether the user considered the email as graymail in the database; and means for performing machine learning in the classifier model using the stored extracted features and stored information about whether the user considered the email as graymail.

In Example 32 the subject matter of any of Examples 25-27 optionally includes wherein the means for tracking user actions on the email comprises: means for identifying the email with a unique identification before providing the email to the user; and means for associating the user actions with the unique identification of the email.

Example 33 is a method of detecting graymail without explicit user feedback, comprising: receiving an email for a user; extracting features of the email; passing the extracted features to a classifier model; predicting with the classifier model whether the user would consider the email as graymail; labelling the email as graymail or non-graymail based on the classifier model; tracking user actions on the email; determining whether the user considered the email as graymail responsive to the tracked user actions without explicit user feedback; and training the classifier model responsive to the tracked user actions.

In Example 34 the subject matter of Example 33 optionally includes wherein tracking user actions on the email comprises: inserting tracking elements into the email before providing the email to the user; detecting user actions on the email using the tracking elements; and identifying the detected user actions.

In Example 35 the subject matter of any of Examples 33-34 optionally includes wherein determining whether the user considered the email as graymail comprises: detecting user actions on the email; analyzing the detected user actions; and determining whether the detected user actions indicate the user considers the email as graymail or non-graymail.

In Example 36 the subject matter of Example 35 optionally includes wherein training the classifier model comprises: storing information about whether the user considered the email as graymail in the database; and performing supervised learning in the classifier model using the stored extracted features and stored information about whether the user considered the email as graymail.

In Example 37 the subject matter of any of Examples 33-36 optionally includes wherein tracking user actions on the email comprises: identifying the email with a unique identification before providing the email to the user; and associating the user actions with the unique identification of the email.

Example 38 is a computer readable medium, on which is stored software for detecting graymail without explicit user feedback, comprising instructions that when executed by a graymail detection system cause the graymail detection system to: receive an email for a user; extract features of the email; predict with a classifier model based on the extracted features whether the user would consider the email as graymail; label the email as graymail or non-graymail based on the classifier model; track user actions on the email; determine whether the user considered the email as graymail responsive to the tracked user actions without explicit user feedback; and train the classifier model responsive to the tracked user actions.

In Example 39 the subject matter of Example 38 optionally includes wherein the instructions that when executed cause the graymail detection system to track user actions on the email comprise instructions that when executed cause the graymail detection system to: insert tracking elements into the email before providing the email to the user; detect user actions on the email using the tracking elements; and identify the detected user actions.

In Example 40 the subject matter of any of Examples 38-39 optionally includes wherein the instructions that when executed cause the graymail detection system to determine whether the user considered the email as graymail comprise instructions that when executed cause the graymail detection system to: detect user actions on the email; analyze the detected user actions; and determine whether the user considered the email as graymail or non-graymail responsive to the analysis.

In Example 41 the subject matter of Example 40 optionally includes wherein the instructions that when executed cause the graymail detection system to train the classifier model comprise instructions that when executed cause the graymail detection system to: store information about whether the user considered the email as graymail in the database; and perform machine learning in the classifier model using the stored extracted features and stored information about whether the user considered the email as graymail.

In Example 42 the subject matter of any of Examples 38-41 optionally includes wherein the instructions that when executed cause the graymail detection system to track user actions on the email comprise instructions that when executed cause the graymail detection system to: identify the email with a unique identification before providing the email to the user; and associate the user actions with the unique identification of the email.

Example 43 is a system for detecting graymail without explicit user feedback, comprising: a data analytics computer system, comprising: a processing element; and a memory, coupled to the processing element, on which is stored software for predicting whether a user would consider an email graymail, comprising instructions that when executed cause the processing element of the data analytics computer system to: receive an email for a user; extract features of the email; predict with a classifier model based on the extracted features whether the user would consider the email as graymail; and label the email as graymail or non-graymail based on the classifier model; train the classifier model responsive to tracked user actions; and a tracking engine computer system, comprising: a processing element; and a memory coupled to the processing element, on which is stored software for tracking user actions on the email, comprising instructions that when executed cause the processing element of the tracking engine computer system to: track user actions on the email; determine whether the user considered the email as graymail responsive to the tracked user actions without explicit user feedback; and provide information regarding the determination to the data analytics computer system for training the classifier model.

In Example 44 the subject matter of Example 43 optionally includes wherein the instructions that when executed cause the processing element of the tracking engine computer system to track user actions on the email comprise instructions that when executed cause the processing element of the tracking engine computer system to: insert tracking elements into the email before providing the email to the user; detect user actions on the email using the tracking elements; and identify the detected user actions.

In Example 45 the subject matter of any of Examples 43-44 optionally includes wherein the instructions that when executed cause the processing element of the tracking engine computer system to determine whether the user considered the email as graymail comprise instructions that when executed cause the processing element of the tracking engine computer system to: detect user actions on the email; analyze the detected user actions; and determine whether the user considered the email as graymail or non-graymail responsive to the analysis.

In Example 46 the subject matter of Example 45 optionally includes wherein the instructions that when executed cause the processing element of the data analytics computer system to train the classifier model comprise instructions that when executed cause the processing element of the data analytics computer system to: store information about whether the user considered the email as graymail in the database; and perform machine learning in the classifier model using the stored extracted features and stored information about whether the user considered the email as graymail.

In Example 47 the subject matter of any of Examples 43-46 optionally includes wherein the instructions that when executed cause the processing element of the tracking engine computer system to track user actions on the email comprise instructions that when executed cause the processing element of the tracking engine computer system to:

identify the email with a unique identification before providing the email to the user; and associate the user actions with the unique identification of the email.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method of detecting graymail without explicit user feedback, comprising:
   receiving a non-spam email for a user;
   extracting features of the email;
   passing the extracted features to a classifier model;
   predicting with the classifier model whether the user would consider the email as graymail;
   modifying the email by inserting tracking information before delivering the email to the user;
   storing the inserted tracking information in a tracking database;
   tracking user actions on the email without explicit user feedback using the inserted tracking information;
   updating the tracking database upon detection of tracked user actions on the email;
   determining whether the user considered the email as graymail responsive to the tracked user actions without explicit user feedback; and
   training the classifier model responsive to the tracked user actions.

2. The method of claim 1, wherein the classifier model is a regression model.

3. The method of claim 1, wherein predicting with the classifier model whether the user would consider the email as graymail comprises:
   labelling the email as graymail or non-graymail based on the classifier model.

4. The method of claim 1, wherein tracking in the user actions on the email without explicit user feedback using the inserted tracking information comprises:
   detecting user actions on the email using the inserted tracking information without explicit user feedback; and
   identifying the detected user actions,
   wherein updating the tracking database upon detection of tracked user actions on the email comprises storing information about the identified detected user actions in the tracking database.

5. The method of claim 1, wherein determining whether the user considered the email as graymail comprises:
   detecting user actions on the email without receiving explicit user feedback;
   analyzing the detected user actions; and
   determining whether the detected user actions indicate the user considers the email as graymail or non-graymail.

6. The method of claim 1, further comprising:
   storing the extracted features in a database.

7. The method of claim 6, wherein training the classifier model comprises:
   storing information about whether the user considered the email as graymail in the database; and
   performing supervised learning in the classifier model using the stored extracted features and stored information about whether the user considered the email as graymail.

8. The method of claim 1, wherein tracking user actions on the email without explicit user feedback using the inserted tracking information comprises:
   identifying the email with a unique identification before providing the email to the user; and
   associating the user actions with the unique identification of the email.

9. A non-transitory computer readable medium, on which is stored software for detecting graymail without explicit user feedback, comprising instructions that when executed by a graymail detection system cause the graymail detection system to:
   receive a non-spam email for a user;
   extract features of the email;
   predict with a classifier model based on the extracted features whether the user would consider the email as graymail;
   modifying the email by inserting tracking information before delivering the email to the user;
   storing the inserted tracking information in a tracking database;
   track user actions on the email without explicit user feedback using the inserted tracking information;
   updating the tracking database upon detection of tracked user actions on the email;
   determine whether the user considered the email as graymail responsive to the tracked user actions without explicit user feedback; and
   train the classifier model responsive to the tracked user actions.

10. The computer readable medium of claim 9, wherein the classifier model is a support vector machine model.

11. The computer readable medium of claim 9, wherein the instructions that when executed cause the graymail detection system to predict with the classifier model whether the user would consider the email as graymail comprise instructions that when executed cause the graymail detection system to:
    label the email as graymail or non-graymail based on the classifier model.

12. The computer readable medium of claim 9, wherein the instructions that when executed cause the graymail detection system to track user actions on the email without explicit user feedback using the inserted tracking information comprise instructions that when executed cause the graymail detection system to:
    detect user actions on the email using the inserted tracking information without explicit user feedback; and
    identify the detected user actions,
    wherein the instructions that when executed cause the graymail detection system to update the tracking database upon detection of tracked user actions on the email comprise instructions that when executed cause the graymail detection system to store information about the identified detected user actions in the tracking database.

13. The computer readable medium of claim 9, wherein the instructions that when executed cause the graymail detection system to determine whether the user considered the email as graymail comprise instructions that when executed cause the graymail detection system to:
    detect user actions on the email without explicit user feedback;

analyze the detected user actions; and determine whether the user considered the email as graymail or non-graymail responsive to the analysis.

14. The computer readable medium of claim 9, wherein the instructions further comprise instructions that when executed cause the graymail detection system to:

store the extracted features in a database.

15. The computer readable medium of claim 14, wherein the instructions that when executed cause the graymail detection system to train the classifier model comprise instructions that when executed cause the graymail detection system to:

store information about whether the user considered the email as graymail in the database; and perform machine learning in the classifier model using the stored extracted features and stored information about whether the user considered the email as graymail.

16. The computer readable medium of claim 9, wherein the instructions that when executed cause the graymail detection system to track user actions on the email without explicit user feedback using the inserted tracking information comprise instructions that when executed cause the graymail detection system to:

identify the email with a unique identification before providing the email to the user; and associate the user actions with the unique identification of the email.

17. A system for detecting graymail without explicit user feedback, comprising:

a data analytics computer system, comprising:
a processing element; and
a memory, coupled to the processing element, on which is stored software for predicting whether a user would consider an email graymail, comprising instructions that when executed cause the processing element of the data analytics computer system to:
receive a non-spam email for a user;
extract features of the email;
predict with a classifier model based on the extracted features whether the user would consider the email as graymail; and
train the classifier model responsive to tracked user actions; and a tracking engine computer system, comprising:
a processing element;
a tracking database; and
a memory coupled to the processing element, on which is stored software for tracking user actions on the email, comprising instructions that when executed cause the processing element of the tracking engine computer system to:
modify the email by inserting tracking information before delivering the email to the user;
storing the inserted tracking information in a tracking database;
track user actions on the email without explicit user feedback using the inserted tracking information;
update the tracking database upon detection of tracked user actions on the email;
determine whether the user considered the email as graymail responsive to the tracked user actions without explicit user feedback; and
provide information regarding the determination to the data analytics computer system for training the classifier model.

18. The system of claim 17, wherein the classifier model is a regression model.

19. The system of claim 17, wherein the instructions that when executed cause the processing element of the data analytics computer system to predict with the classifier model based on the extracted features whether the user would consider the email as graymail comprise instructions that when executed cause the processing element of the data analytics computer system to:

label the email as graymail or non-graymail based on the classifier model.

20. The system of claim 17, wherein the instructions that when executed cause the processing element of the tracking engine computer system to track user actions on the email without explicit user feedback comprise instructions that when executed cause the processing element of the tracking engine computer system to:

detect user actions on the email using the inserted tracking information without explicit user feedback; and identify the detected user actions, wherein the instructions that when executed cause the processing element of the tracking engine computer system to update the tracking database comprise instructions that when executed cause the processing element of the tracking engine computer system to store information about the identified detected user actions in the tracking database.

21. The system of claim 17, wherein the instructions that when executed cause the processing element of the tracking engine computer system to determine whether the user considered the email as graymail comprise instructions that when executed cause the processing element of the tracking engine computer system to:

detect user actions on the email;

analyze the detected user actions; and determine whether the user considered the email as graymail or non-graymail responsive to the analysis.

22. The system of claim 17, wherein the instructions further comprise instructions that when executed cause the processing element of the data analytics computer system to:

store the extracted features in a database.

23. The system of claim 22, wherein the instructions that when executed cause the processing element of the data analytics computer system to train the classifier model comprise instructions that when executed cause the processing element of the data analytics computer system to:

store information about whether the user considered the email as graymail in the database; and perform machine learning in the classifier model using the stored extracted features and stored information about whether the user considered the email as graymail.

24. The system of claim 17, wherein the instructions that when executed cause the processing element of the tracking engine computer system to modify the email by inserting tracking information before delivering the email to the user comprise instructions that when executed cause the processing element of the tracking engine computer system to:

identify the email with a unique identification before providing the email to the user, and wherein the instructions that when executed cause the tracking engine computer system to track user actions on the email without explicit user feedback using the inserted tracking information comprise instructions that when executed cause the tracking engine computer system to associate the user actions with the unique identification of the email.

* * * * *